United States Patent

Harper

[11] Patent Number: 6,066,060
[45] Date of Patent: May 23, 2000

[54] AUXILIARY PUMP SYSTEM FOR AUTOMATIC TRANSMISSIONS

[76] Inventor: James E. Harper, P.O. Box 1734, Pendleton, Oreg. 97801

[21] Appl. No.: 09/185,367
[22] Filed: Nov. 3, 1998
[51] Int. Cl.⁷ .................................................. F16H 57/04
[52] U.S. Cl. ......................................... 475/136; 184/6-12
[58] Field of Search ..................... 475/136, 137; 184/6–12, 1–5

[56] References Cited

U.S. PATENT DOCUMENTS

| | | | |
|---|---|---|---|
| 2,917,949 | 12/1959 | Gunderson et al. | 475/136 |
| 3,107,621 | 10/1963 | Szady et al. | 475/136 |
| 3,326,061 | 6/1967 | Ahlen | 475/136 |
| 3,631,744 | 1/1972 | Blomquist | 74/868 |
| 3,650,162 | 3/1972 | Leising | 74/867 |
| 3,733,920 | 5/1973 | Annis | 74/763 |
| 4,502,350 | 3/1985 | Polak | 74/730 |
| 5,291,968 | 3/1994 | Brown | 184/1.5 |
| 5,522,474 | 6/1996 | Burman | 184/1.5 |
| 5,806,629 | 9/1998 | Dixon et al. | 184/1.5 |

*Primary Examiner*—Dirk Wright
*Attorney, Agent, or Firm*—Wells, St. John, Roberts, Gregory & Matkin, P.S.

[57] ABSTRACT

An auxiliary pressure system is described for a hydraulic activated automotive automatic transmission having a hydraulic fluid reservoir and a line pressure circuit. The system includes an automatic transmission hydraulic fluid connector line having an intake end configured for attachment to a hydraulic fluid reservoir. A pressurization device is connected to the automatic transmission hydraulic fluid connector line, configured and operable to receive hydraulic fluid from the hydraulic fluid reservoir and place such hydraulic fluid under positive pressure sufficient to actuate the automatic transmission. A pressure delivery line including a fitting configured for connection to the line pressure circuit of the automatic transmission, is connected to the pressurization device to deliver hydraulic fluid under positive pressure from the pressurization device to the line pressure circuit and thereby provide operating hydraulic pressure to the transmission for normal operation.

8 Claims, 3 Drawing Sheets

AUXILIARY PUMP SYSTEM FOR AUTOMATIC TRANSMISSIONS

TECHNICAL FIELD

The present invention relates to auxiliary operation of automotive automatic transmissions by supplying fluid pressure from an outside source when such pressure is not made available for operating the transmissions by the integral pressure producing sources within such transmissions.

BACKGROUND OF THE INVENTION

Modern automotive automatic transmissions are produced with an internal pump for supplying hydraulic fluid at selected pressures for operation of the various components within the transmission that relate to gear shifting. Such internal pumps operate only when the vehicle engine is operating. For this reason, a vehicle supplied with a modern automatic transmission cannot be push or pull started.

Further, a modern automatic transmission cannot be relied upon to slow the associated vehicle using engine compression without the engine running. Once the vehicle slows to a point where the internal pump is not working, the transmission will shift to a non-operational mode and allow the vehicle to freewheel. This can be a dangerous situation especially if the vehicle is equipped with power steering and brakes, since the non-running engine will not provide operational power to drive the power steering or power brake pumps. Vehicle handling thus becomes dangerously difficult.

Actually, the above problems were answered to a limited degree in many automatic transmissions built prior to 1966. Many of these previous transmissions included internal secondary pumps that were driven by the vehicle drive lines, not the engines. This type of transmission had the advantage of allowing push starts once the vehicle was pushed beyond a speed where the secondary pump (being driven by the vehicle drive line) would build sufficient hydraulic pressure to operate the transmission. This usually required speeds of 15–30 mph. The transmission could also be counted upon to slow the vehicle (by selection of lower gears) to lower speeds than modern transmissions. However, the transmission could only slow the vehicle while the secondary pump remained operable.

Even with the above advantages, the secondary pumps added to the overall manufacturing costs for the transmissions. The secondary pumps themselves were not without drawbacks. In addition to the cost factor, such internal pumps required periodic maintenance and replacement, since they operated continuously while the vehicle was moving (even when use was not required). Maintenance or replacement of the pumps was difficult and costly to the vehicle owners. Additionally, the required speed for push or pull starting often led to dangerous situations. Still further, the pumps were not switchable and since they were operational at nearly all times the vehicle was in motion, an unnecessary reduction in fuel efficiency was experienced (it took energy to run the pumps even when they were not needed for transmission operation).

The present invention provides solutions to problems found with both forms of transmissions (those with primary pumps only, and those with primary and secondary pumps).

The present invention provides an auxiliary fluid pressure source that is provided outside the standard automatic transmission housing and is connected to the pressure lines within the transmission in order to selectively deliver operating fluid pressure to the internal working components of the transmission. By doing this, pressure may be supplied to the transmission regardless of inoperability of the engine, primary or secondary pumps, so the transmission will remain operational as long as the auxiliary pressure system operates. Since the pressure system may be operated by energy supplied independently of the engine and drive line, there is no requirement that the vehicle be moving at speeds sufficient to elevate the fluid pressure to operational levels, or that the engine be operating for the transmission to be operated.

An object of the invention is thus to provide an auxiliary pressure system for automatic automotive transmissions that may be operated independently of drive line operation or internal transmission pump operation.

A further object is to provide a pressurization system that may be produced along with transmissions or that can be added as a retrofit to existing transmissions.

A still further object is to provide such a system that may be operated to enable low speed push, pull or inertia starting of a vehicle engine.

An additional object is to provide such a system that may be operated to enable use of an automatic transmission to effectively slow a vehicle using engine compression braking to low speeds without the engine running, and thereby permitting operation of associated power steering and power brake pumps to enable safe handling of the vehicle.

The above and still further objects and advantages may be realized from the following detailed description of the invention.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
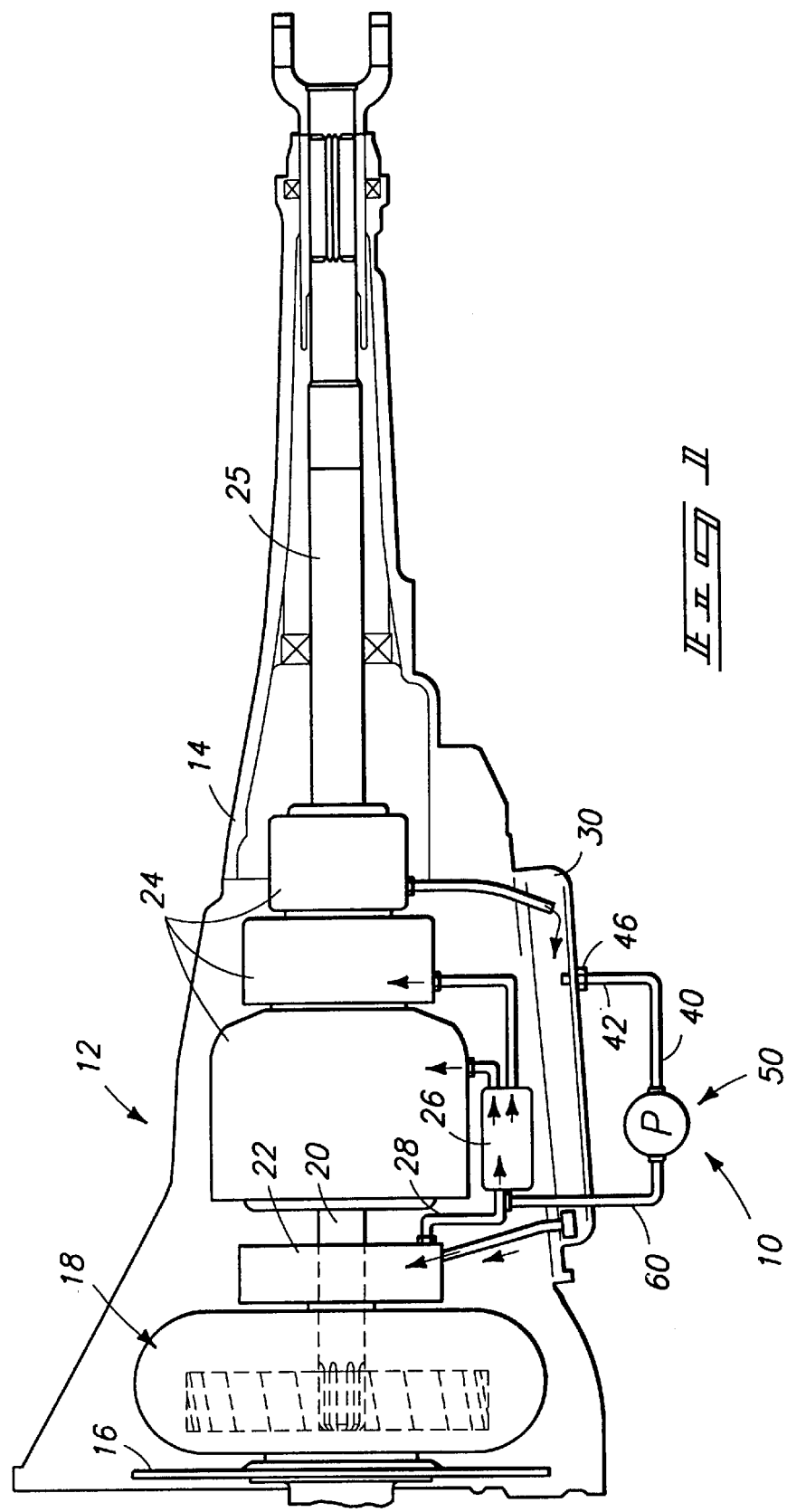
FIG. 1 is a schematic view of an automatic vehicle transmission with a generic auxiliary pump system operably connected thereto.

This disclosure of the invention is submitted in furtherance of the constitutional purposes of the U.S. Patent Laws "to promote the progress of science and useful arts" (Article 1, Section 8).

The present auxiliary pressure system for a hydraulic activated automotive automatic transmission is generally designated in the drawings by the reference numeral 10. The system 10 is provided for use with standard automotive automatic transmission 12 that may be similar to that disclosed in U.S. Pat. No. 3,631,744, issued to Blomquist et al on Jan. 4, 1972. Portions of such patent relating to internal automatic transmission mechanisms and hydraulic fluid circuitry are hereby incorporated by reference into the present application.

In general, the automotive automatic transmission 12, as diagrammatically illustrated in FIG. 1, will include a rigid transmission housing 14 that mounts an internal torque converter driver 16 configured to be rotated by a conventional engine (not shown). A torque converter 18 is situated within the housing connected to the torque converter driver 16 for driving an input shaft 20. An internal hydraulic pump 22 is typically found within the housing, driven by the torque converter 18 for producing hydraulic fluid pressure for supplying hydraulic fluid under operating pressure to the working components within the transmission.

In typical modern automotive transmissions, the internal pump 22 supplies fluid under controlled pressure to the torque converter, and to selectively actuate the clutch and gear assembly 24 within the housing. The clutch and gear assembly 24 operably connects the input shaft 20 with an output shaft 25, which provides connection for the vehicle drive line (not shown).

A hydraulic control diagrammatically shown at 26 includes hydraulic line pressure circuit 28 that extends between the internal hydraulic pump and the clutch and gear assembly 22 for receiving hydraulic fluid from the internal hydraulic pump, to actuate the clutch and gear assembly. Various known forms of servos, brakes, valving and other components (see U.S. Pat. No. 3,631,744, incorporated by reference above) are typically provided in the line pressure circuit 28 to effect the transmission of torque through the clutch and gear assembly 24 and determine the final rpm of the output shaft 25 in response to engine rpm and engine loading. It is noteworthy, however, that the operating pressure for at least most of such components is produced by the internal pump, and that if the pump is not operational, the transmission will not operate as intended. It is also noteworthy that the internal pump typically provides a primary fluid supply, and that the flow rate and operating pressures are varied by requirements of the various hydraulic circuits. One circuit common to the forward gearing is the pressure line termed "line pressure." Pressure is modified through various sub-circuits by appropriate pressure controls, and is capable of being monitored through a line pressure test port 29 (FIG. 2) that is typically provided on most automatic transmissions. Delivery of pressurized hydraulic fluid to the line pressure circuit will enable operation of the transmission at least through forward gearing and will supply transmission lubrication while the transmission is in forward, reverse, or park modes.

In typical automotive automatic transmissions, a hydraulic fluid reservoir 30 is supplied as a sump for hydraulic fluid. In some transmissions, the reservoir is supplied with a drain plug (not shown), others are simply a pan configuration that is attached by bolts to the bottom of the transmission housing. Hydraulic fluid accumulates in the reservoir 30 to be drawn into the internal pump and cycled at selected operating pressures to the various working components of the transmission.

In preferred forms of the present system 10, a hydraulic fluid connector line 40 is provided, having an intake end 42 configured for attachment to the hydraulic fluid reservoir 30. In one preferred form, the intake end is provided with an appropriate threaded fitting 44 (FIG. 2) that may be threadably engaged within a formed, threaded hole formed in the reservoir pan.

In other forms, where the reservoir includes a drain plug, the intake end may be provided as a fitting 46 (FIG. 1) that will substitute for the drain plug. Still other forms of fittings may also be used. For example, a conventional pan drain plug could be bored and threaded for reception of an appropriately sized fitting, similar to the fitting 44. It is also possible for a specialized reservoir to be provided with the fitting built-in.

To assure clean fluid is delivered through the present system, it is desirable to provide a filter 48 in the line 40 (or 60). Line filters such as shown in FIG. 1 are commonly available and relatively inexpensive and, since forms of the fitting 46 may take fluid from the bottom of the reservoir, filtration may be preferred.

The connector line 40 leads to an auxiliary pressurization device 50 that is external to the transmission housing. In preferred forms, the auxiliary pressurization device 50 operates independently of the internal hydraulic pump 22 to receive hydraulic fluid from the hydraulic fluid reservoir 30 and place such hydraulic fluid under positive pressure sufficient to actuate the automatic transmission.

The device 50 may be provided in various forms, as will be discussed in greater detail below. In preferred forms, however, the device 50 is provided to receive and pressurize hydraulic fluid collected from the reservoir 30, and to deliver the pressurized fluid to the line pressure circuit 28 of the transmission irrespective of operation of the vehicle engine, or operation of the internal transmission pump 22 or pumps if more than one internal pump is provided.

In a preferred form, the present system 10 includes a pressure delivery line 60 including a fitting 62 connected to the line pressure circuit 28 of the automatic transmission 12. A remaining end of the pressure delivery line 60 is connected to the output side of the pressurization device 50. Operation of the pressurization device may thus result in flow of hydraulic fluid under positive pressure from the pressurization device and into the line pressure circuit 28. This is done to provide operating hydraulic pressure to the transmission, irrespective of whether the associated engine is operational, or whether the internal hydraulic pumps are operating.

In a preferred form of the present system, a one-way flow valve 64 (FIG. 2) is provided in the pressure delivery line 60, configured to allow flow of hydraulic fluid into the transmission, and to prevent hydraulic fluid flow toward the pressurization device 50. It is also possible that the pressurization device 50 itself could include an internal one-way check valve that would function equally well to prevent backflow of hydraulic fluid though the pressure delivery line 60 and into the pressurization device.

In preferred forms, the pressurization device 50 is a hydraulic pump of an appropriate form useful to produce the desired pressure in the transmission hydraulic fluid. Thus the pump may be a conventional impeller, a centrifugal or positive displacement pump 66 (FIG. 2), or a different variety of pressure producing device such as a pneumatic or otherwise driven piston pump 68, as diagrammatically shown in FIG. 3.

The pump may be selected for operation using various appropriate sources of power. In a preferred example (FIG. 2), the pump 66 is electrically driven (FIG. 2), through an auxiliary electrical energy source 70, connected in an electrical circuit 72. In this embodiment, the pump is preferred to be capable of delivering approximately 1–2 gpm at between approximately 50–200 psi. It is preferable that the pump 66 be selected having a built-in pressure regulator to enable use of the system with various types and brands of automatic transmissions, so the normal operating line pressure of the particular transmission may be approximately matched by adjusting the pump pressure regulator.

By way of example a pump, model number 52065-c131 distributed by Northern Hydraulics at P.O. Box 1499, Burnsville, Minn. 55337, is capable of delivering 200 psi at 1.8 gpm. This pump is driven by an internal electric motor which will operate adequately using current supplied by an automotive or motorcycle type battery.

In the energy source 70, an auxiliary battery 76 may be supplied to drive the pump 66. The additional battery 76 is preferred over simply using the existing automotive battery 77 and electrical circuitry since in many instances where the auxiliary pump 66 is needed, the existing automotive battery 77 may be discharged or inoperable. By providing an auxiliary battery 76, a substantially constant source of electrical energy is available when it is desired to use the auxiliary pump 66.

The battery 76 may be connected in a charging circuit 78 to the main vehicle electrical power supply so charging may occur when the engine is running. If desired, a vacuum or other automatically operated switch 79 may be supplied in charging circuit 78 that will open the charging circuit 78 when the engine and transmission are inoperable (the vehicle is at rest), but will close when the engine is turning (as during an inertia or push start), to enable the auxiliary battery 76 to deliver sufficient electrical energy to the vehicle electrical system to activate the vehicle alternator.

An on-off switch 80 may be provided in the electrical circuit 72 to enable the user to selectively operate the pump 66. A warning lamp or other appropriate indicator device 82 may also be provided in the circuit 72 to indicate the pump is operating. It is anticipated that the switch 80 could be replaced by other more automated switching arrangements. For example, an automatic switching system could be employed that could operate in response to the vehicle ignition and an appropriate vehicle motion sensor (not shown) to automatically initiate operation of the pump when the vehicle is moving but the engine is not running.

By appropriately selecting or adjusting the pressure output of the pump, the present system may be made to operate with a pressure actuated switch 84, operably connected in the pressure delivery line 60 and configured to open the electrical circuit 72 at a pressure exceeding the selected operating pressure of the pump 66. By way of example, say the maximum line pressure for a transmission is 105 psi. If the pump 66 is set for a maximum output of 100 psi, a situation in which the hydraulic line pressure exceeds 100 psi would cause the switch 84 to open the circuit 72 and deactivate the pump 66. This feature, though not required for operation of the present system, may be desirable to minimize the chance the pump 66 will be accidently left running simultaneously with the internal pump 22.

The above situation could occur should the pump 66 be left on accidently after the engine is started, or following a push or inertia starting situation where the engine is started while the pump 66 is running. The internal pump 22 would raise the pressure to the 105 psi operating pressure (5 psi more than the output of pump 66), and cause the pressure sensitive switch 84 to open the power circuit 72 to the pump 66.

As indicated above, various forms of pressurization devices may be used in the present invention. While the above pumping arrangement is preferred, a similar arrangement could be provided using a different form of pressurization device that is driven by another energy source.

Figure 3:
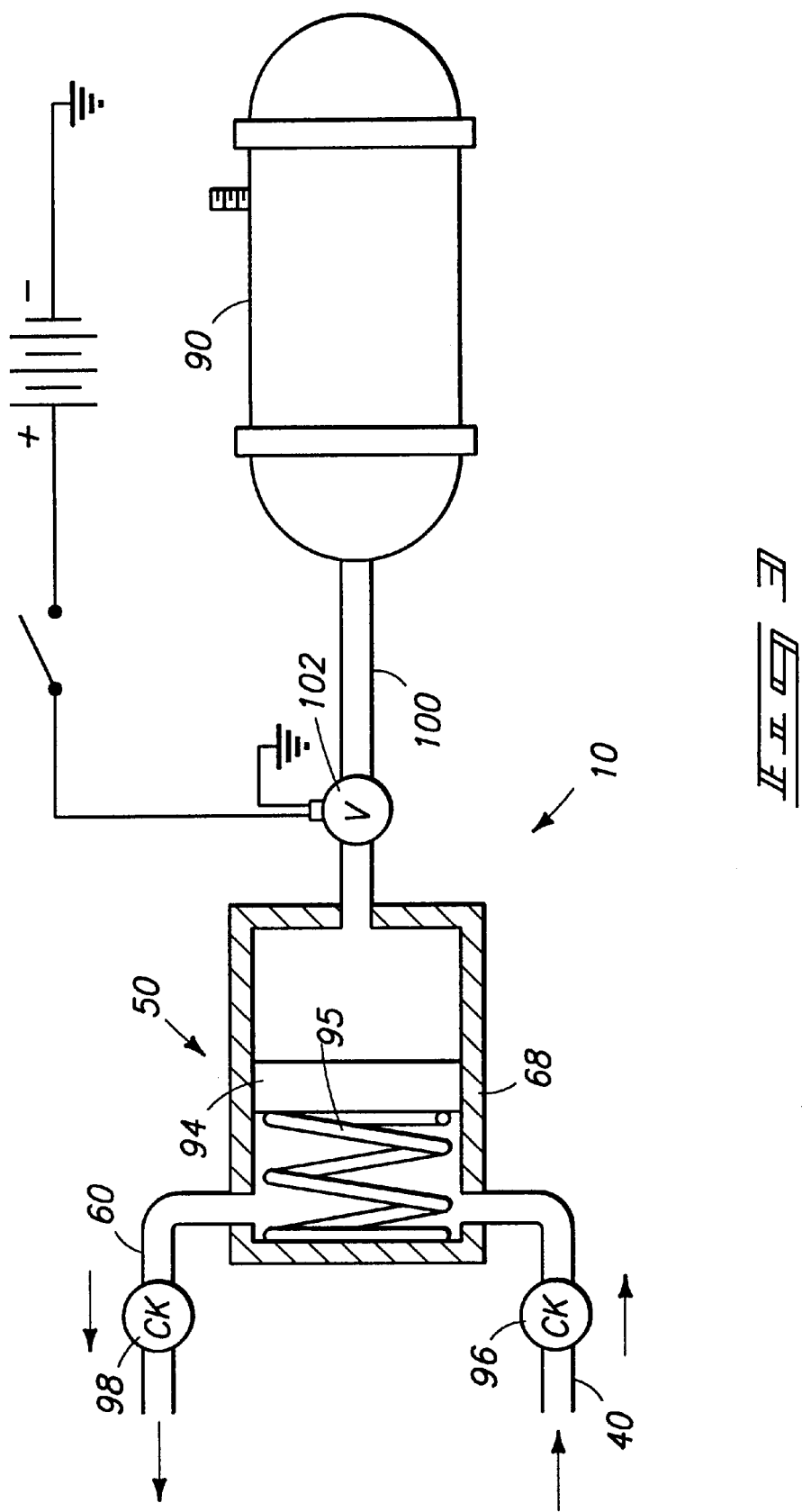
FIG. 3 is fragmented schematic view of another alternate form of the present auxiliary pump system.

In one example, a plunger or accumulator form of diaphragm or piston pump 68 may be used to pressurize the hydraulic fluid, as shown diagrammatically in FIG. 3. Here the pressurization device is a cylinder and piston ram 94 connected to the pressure delivery line 60 and connector line 40. Appropriate one-way valves 96, 98 may be provided to enable one-way directional flow of the hydraulic fluid through the ram 94 and toward the transmission.

Energy for operation of the ram may be supplied again by a variety of sources. In the illustrated example an air tank 90, with an appropriate fitting for receiving pressurized air or other compressible fluid, is connected to the ram by a delivery tube 100.

An appropriate on-off valve 102 is provided along the delivery tube to control application of pressure to the ram. When it is desired to operate the ram, the valve is simply opened to allow air pressure from the tank to shift the plunger or diaphragm within the ram, thereby applying pressure to the fluid in the ram cylinder, which in turn, is transmitted into the line pressure circuit of the transmission and allowing short term operation.

When the air pressure is exhausted or when the valve is turned off, an internal spring 95 will push the plunger or diaphragm back to the starting position, drawing another charge of fluid from the reservoir and readying the ram for a subsequent operation. Once the tank runs low on air, re-pressurization may be accomplished by attaching the tank to an appropriate compressed air source such as a common tire inflating pump.

The above is intended to exemplify pressurization devices that may be used in the present system. Other pumps may be envisioned that could also be utilized. For example there are air or vacuum driven pumps that could be used in either embodiment. In such a situation the pump would be driven by a source of air pressure such as the air tank generally shown at 90 in FIG. 3, or from another appropriate source.

OPERATION

Prior to operation, the present system is installed on a selected existing transmission. Alternatively the system may be assembled in combination with a new transmission. In either instance, installation is completed generally by connecting the above described hydraulic fluid lines 40, 60 to the transmission, connecting the lines to the pressurization device 50, mounting the pressurization device 50 either to the transmission exterior or to an adjacent chassis part, and connecting the selected energy source to the device 50.

Figure 2:
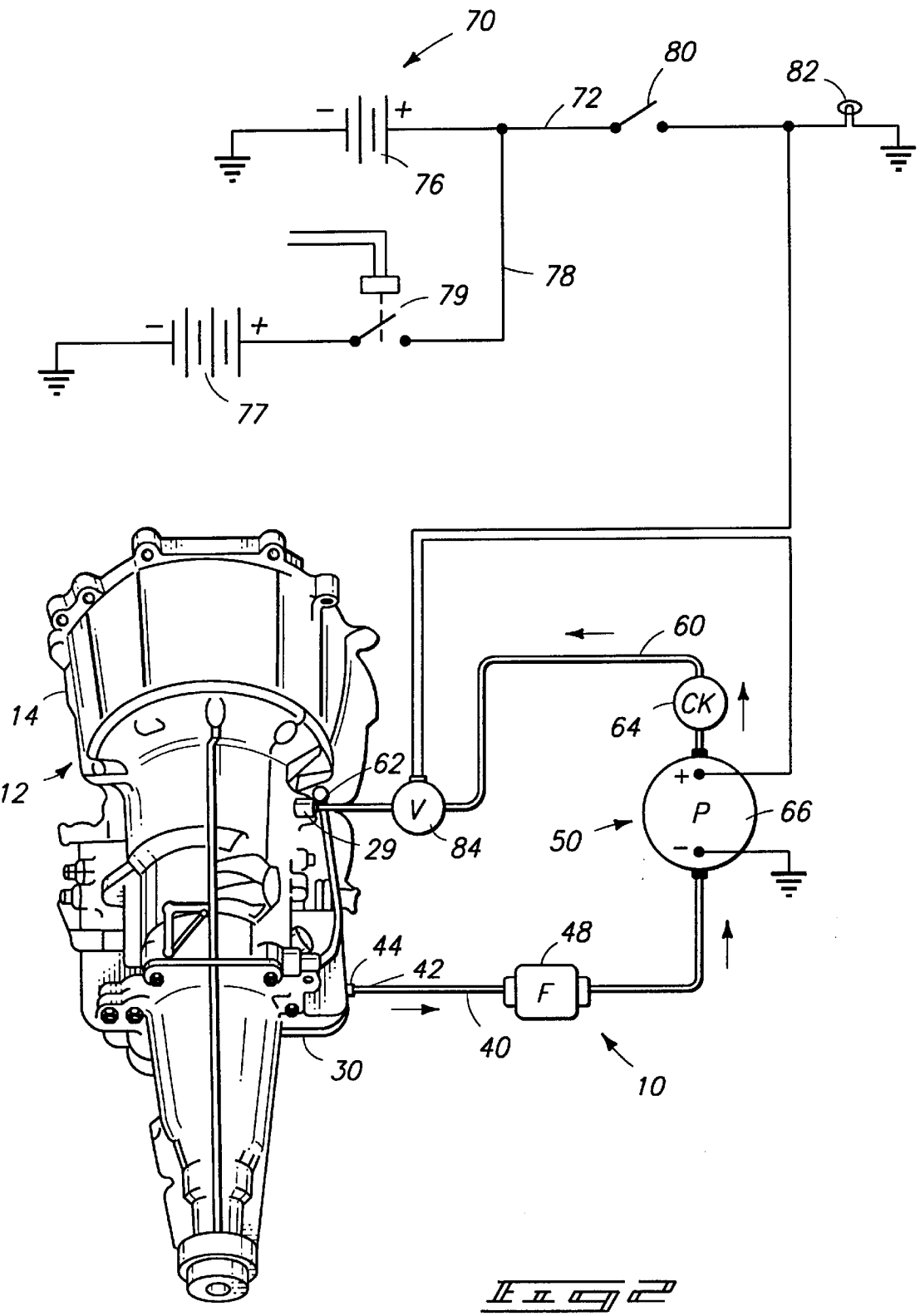
FIG. 2 is a schematic view of an automatic vehicle transmission with an electrically operated version of the present auxiliary pump system and an exemplary electrical power circuit.

In the specific preferred example shown in FIG. 2, the connector line 40 may be joined to the transmission reservoir 30 by any of the devices described above, according to the nature of the transmission. Filter 40 (if used) may be installed before or after installation of the line.

The pressurization device 50 is mounted either directly to the transmission housing or (more preferably) to the adjacent vehicle chassis by conventional fasteners (not shown). The line 40 is attached to the intake side of the device 50. The pressure delivery line 60 is also attached. If needed, a one-way check valve 64 may be installed in the line 60 and if desired, the pressure actuated switch 84 may also be connected in the line downstream of the check valve 64 as shown in FIG. 1.

The fitting 62 at the discharge end of the pressure delivery line 60 may be connected to the transmission hydraulics by simply removing the typical line pressure test plug and replacing it with the fitting 62. The system is now installed except for wiring.

In the preferred form where an electric pump is used, operating electrical energy may be supplied by the auxiliary battery 76 through the circuit 72. To connect this assembly, an appropriate mounting location is found for the battery 76, then a wire is run to ground from the typical grounded pole of the battery (usually the negative side), and the pump motor is likewise grounded. The circuit is then connected between the other battery pole and the pump, or to the pressure actuated switch 84 (if provided), then to the pump. The switch 80 and lamp or other warning device 82 are mounted within the vehicle within easy reach from the driver's position.

Of course it is possible to modify the electrical controls and circuitry such that operation of the pump may be made relatively automatic, depending upon the running condition of the vehicle engine (with ignition on). Such circuitry though not shown herein is well within the capability of automotive electrical circuitry designers.

If the pressure actuated switch 84 is utilized, it will be desirable for proper operation to set the delivery pressure of the pump at a lower pressure, say approximately 5 psi less than the normal operating line pressure of the transmission. By doing so, when the transmission 12 and internal pump 22 are operating under power produced by the operating vehicle engine, the higher line pressure acting against the switch 84 will actuate the switch to open the circuit, thereby turning the pump 66 off. The on-off switch 80 will function to switch the pump 66 off at any selected time regardless of operation of the pressure actuated switch 84.

Operation of the present system will be discussed in terms of the preferred example installed as described immediately above, and in several modes depending upon particular situations where operation of the system becomes very useful.

First, a fairly typical situation occurs where a vehicle battery becomes discharged and will not provide sufficient energy to start the engine. In most modern vehicles with automatic transmissions, push, pull or inertia starting is not an alternative. With the present system in place, however, this form of starting is entirely possible. The driver simply turns the switch 80 on and the auxiliary battery will operate the pump, which will circulate hydraulic fluid through the transmission to allow push starting. The pressure build-up is almost immediate, so the vehicle need only be pushed at low speeds (sufficient for operation of the torque converter) to allow the driver to shift the transmission into gear and allow the engine to start under compression. The pump 66 also serves during the starting procedure to provide lubrication to the transmission, at least so long as the transmission remains in the selected forward gear.

It is noted that the starting procedure is enhanced even if the vehicle transmission includes an internal secondary pump, since such pumps must rely on vehicle motion to operate. Thus the vehicle must be moved to relatively high speeds for the internal pump to operate. The present system will instead function to provide almost immediate pressure and allow much lower speed compression starting.

Once the engine starts, the driver may simply turn the switch 80 off and allow the transmission to operate normally. If the pressure switch 84 is provided, the pump will be automatically turned off when the transmission line pressure exceeds the input pressure from the pump. The warning light 82 will tell the vehicle operator to turn the main switch 80 off as well.

In still another situation, an engine may fail while the vehicle is moving. In this instance a modern transmission (without a secondary drive line operated pump) will quickly cease operation. This can occur at fairly high speeds, and when the transmission disengages, no driving force is provided to turn the engine and the vehicle will loose its normal power steering and brake function. With the present system, the driver need only turn the switch 80 on to activate the pump so operating fluid pressure is again restored to the transmission and the vehicle can be slowed by engine compression with power steering and power brakes completely operational. Further, the present system will permit the vehicle to be slowed under engine compression to very low speeds (an advantage even over older secondary pump transmissions).

All the above advantages are obtained using the present system which is relatively simple to install, easy to operate, and is accessible for maintenance and repair or replacement without requiring disassembly of the transmission. Further, since the present system is operated by auxiliary power sources, the pump will not reduce the operating efficiency of the vehicle, as do internal secondary pumps.

In compliance with the statute, the invention has been described in language more or less specific as to structural and methodical features. It is to be understood, however, that the invention is not limited to the specific features shown and described, since the means herein disclosed comprise preferred examples of putting the invention into effect. The invention is, therefore, claimed in any of its forms or modifications within the proper scope of the appended claims appropriately interpreted in accordance with the doctrine of equivalents.

I claim:

1. An auxiliary pressure system for a hydraulic activated automotive automatic transmission having a hydraulic fluid reservoir and a line pressure circuit, comprising:

an automatic transmission hydraulic fluid connector line having an intake end configured for attachment to a hydraulic fluid reservoir;

a pressurization device connected to the automatic transmission hydraulic fluid connector line, configured and operable to receive hydraulic fluid from the hydraulic fluid reservoir and place such hydraulic fluid under positive pressure sufficient to actuate the automatic transmission; and a pressure delivery line including a fitting configured for connection to the line pressure circuit of the automatic transmission, and connected to the pressurization device to deliver hydraulic fluid under positive pressure from the pressurization device to the line pressure circuit to provide operating hydraulic pressure to the transmission.

2. An auxiliary pressure system for a hydraulic activated automotive automatic transmission having a hydraulic fluid reservoir and a line pressure circuit as defined by claim 1, further comprising:

a one way flow valve in the pressure delivery line configured to allow flow of hydraulic fluid toward the fitting and to prevent hydraulic fluid flow toward the pressurization device.

3. An auxiliary pressure system for a hydraulic activated automotive automatic transmission having a hydraulic fluid reservoir and a line pressure circuit as defined by claim 1 wherein the pressurization device is a hydraulic pump.

4. An auxiliary pressure system for a hydraulic activated automotive automatic transmission having a hydraulic fluid reservoir and a line pressure circuit as defined by claim 1 wherein the pressurization device is an electrically driven hydraulic pump.

5. An auxiliary pressure system for a hydraulic activated automotive automatic transmission having a hydraulic fluid reservoir and a line pressure circuit as defined by claim 1 wherein the pressurization device is an electrically driven hydraulic pump, and further comprising a source of electrical energy connected in an electrical circuit to the electrically driven hydraulic pump.

6. An auxiliary pressure system for a hydraulic activated automotive automatic transmission having a hydraulic fluid reservoir and a line pressure circuit as defined by claim 1 wherein the pressurization device is an electrically driven hydraulic pump, and further comprising a source of electrical energy connected in an electrical circuit to the electrically driven hydraulic pump, said electrical circuit including a switch selectively operable to open the electrical circuit.

7. An auxiliary pressure system for a hydraulic activated automotive automatic transmission having a hydraulic fluid reservoir and a line pressure circuit as defined by claim 1 wherein the pressurization device is an electrically driven hydraulic pump controlled to pump hydraulic fluid at a selected pressure, and further comprising a source of electrical energy connected in an electrical circuit to the electrically driven hydraulic pump, said electrical circuit including a pressure actuated switch operably connected in the pressure delivery line and configured to open the electrical circuit at a pressure exceeding said selected pressure.

8. A hydraulic activated automotive automatic transmission and external auxiliary pressure system, comprising:

a rigid transmission housing;

a torque converter drive shaft configured to be rotated by an engine;

a torque converter within the housing connected to the torque converter drive shaft for driving an input shaft;

a hydraulic pump within the housing, connected to the input shaft for producing hydraulic fluid pressure;

a clutch and gear assembly within the housing operably connecting the input shaft with an output shaft;

a hydraulic control including hydraulic line pressure circuit between the hydraulic pump and the clutch and gear assembly for receiving hydraulic fluid from the hydraulic pump to actuate the clutch and gear assembly;

a hydraulic fluid reservoir on the housing supplying hydraulic fluid to the hydraulic pump;

a hydraulic fluid connector line having an intake end attached to the hydraulic fluid reservoir;

an auxiliary pressurization device external to the housing and connected to the hydraulic fluid connector line, operable independently of the hydraulic pump to receive hydraulic fluid from the hydraulic fluid reservoir and place such hydraulic fluid under positive pressure sufficient to actuate the automatic transmission; and a pressure delivery line including a fitting connected to the line pressure circuit of the automatic transmission, and connected to the pressurization device to deliver hydraulic fluid under positive pressure from the pressurization device to the line pressure circuit to provide operating hydraulic pressure to the transmission.

\* \* \* \* \*